(12) United States Patent
Liu et al.

(10) Patent No.: US 10,727,521 B2
(45) Date of Patent: Jul. 28, 2020

(54) SOLID OXIDE FUEL CELL STACK DESIGN

(71) Applicant: PHILLIPS 66 COMPANY, Houston, TX (US)

(72) Inventors: Ying Liu, Bartlesville, OK (US); Mark Jensen, Bartlesville, OK (US); Mingfei Liu, Bartlesville, OK (US)

(73) Assignee: PHILLIPS 66 COMPANY, Houston, TX (US)

(*) Notice: Subject to any disclaimer, the term of this patent is extended or adjusted under 35 U.S.C. 154(b) by 51 days.

(21) Appl. No.: 16/135,523

(22) Filed: Sep. 19, 2018

(65) Prior Publication Data

US 2019/0088975 A1 Mar. 21, 2019

Related U.S. Application Data

(60) Provisional application No. 62/560,362, filed on Sep. 19, 2017.

(51) Int. Cl.
| | | |
|---|---|---|
| *H01M 8/00* | (2016.01) | |
| *H01M 8/2432* | (2016.01) | |
| *H01M 8/2475* | (2016.01) | |
| *H01M 8/12* | (2016.01) | |
| *H01M 8/0232* | (2016.01) | |
| *H01M 4/90* | (2006.01) | |

(Continued)

(52) U.S. Cl.
CPC ....... *H01M 8/2432* (2016.02); *H01M 4/9033* (2013.01); *H01M 4/9066* (2013.01); *H01M 8/0232* (2013.01); *H01M 8/0271* (2013.01); *H01M 8/12* (2013.01); *H01M 8/1253* (2013.01); *H01M 8/2475* (2013.01); *H01M 2008/1293* (2013.01)

(58) Field of Classification Search
None
See application file for complete search history.

(56) References Cited

U.S. PATENT DOCUMENTS

| | | |
|---|---|---|
| 6,444,340 B1 | 9/2002 | Jaffrey |
| 2005/0255368 A1 | 11/2005 | Kaye et al. |

(Continued)

FOREIGN PATENT DOCUMENTS

| | | |
|---|---|---|
| WO | 2015198042 | 12/2015 |

OTHER PUBLICATIONS

PCT Notification of Transmittal of the International Search Report and the Written Opinion of the International Searching Authority, or the Declaration, International Application No. PCT/US2018/51743, International Filing Date Sep. 19, 2018, 16 pages.

*Primary Examiner* — Milton I Cano
*Assistant Examiner* — Mary G Henshaw
(74) *Attorney, Agent, or Firm* — Phillips 66 Company

(57) ABSTRACT

A device comprising a first solid oxide fuel cell and a second solid oxide fuel cell. The first solid oxide fuel cell comprises a first anode, a first cathode and a first electrolyte, wherein the first electrolyte is positioned between and connected to the first anode and the first cathode. The second solid oxide fuel cell comprises a second anode, a second cathode and a second electrolyte, wherein the second electrolyte is positioned between and connected to the second anode and the second cathode. In this device the cathode distance between the first cathode and the second cathode is less than the anode distance between the first anode and the second anode.

17 Claims, 7 Drawing Sheets

(51) Int. Cl.
*H01M 8/1253* (2016.01)
*H01M 8/0271* (2016.01)
*H01M 8/124* (2016.01)

(56) References Cited

U.S. PATENT DOCUMENTS

| | | |
|---|---|---|
| 2007/0259242 A1 | 11/2007 | Schaevitz et al. |
| 2013/0189592 A1 | 7/2013 | Roumi et al. |
| 2014/0234744 A1* | 8/2014 | Nielsen .................. H01M 8/248 429/457 |
| 2015/0303490 A1 | 10/2015 | Mukerjee et al. |

* cited by examiner

SOLID OXIDE FUEL CELL STACK DESIGN

CROSS-REFERENCE TO RELATED APPLICATIONS

This application is a non-provisional application which claims the benefit of and priority to U.S. Provisional Application Ser. No. 62/560,362 filed Sep. 19, 2017, entitled "Solid Oxide Fuel Cell Stack Design", which is hereby incorporated by reference in its entirety.

STATEMENT REGARDING FEDERALLY SPONSORED RESEARCH OR DEVELOPMENT

None.

FIELD OF THE INVENTION

A novel solid oxide fuel cell stack design.

BACKGROUND OF THE INVENTION

In solid oxide fuel cell (SOFC) stacks, especially planar stacks with metallic interconnects, contact resistance between the electrodes, especially the cathode, and the metallic interconnect is a major factor in stack performance losses and long-term performance degradation. Conventionally, ceramic contact layers with compositions similar to cathode materials have been used to minimize contact resistance. Unlike the cathode, which has been sintered at high temperatures (950° C. to 1200° C.), it is not ideal for ceramic contact layers to be exposed to high temperatures after stack assembling, otherwise the metallic interconnects will become severely oxidized. When exposed to typical fuel cell operating temperatures (650° C. to 800° C.) the ceramic contact layers exhibit low conductivity and poor adhesion to both the cathode and interconnect. It has been reported in literature that contact layers can contribute up to 40 to 50% of total performance loss in a planar SOFC stack.

In conventional SOFC stack designs, all the cells are connected in series to achieve useful electrical voltage and power. The serial connection of SOFCs has, especially at high power densities, principle related drawbacks. For example, the power output of the whole stack can collapse if a breakdown of one single cell, interconnect, or seal occurs. Due to the configuration it is not always possible to shut down, swap out, or bypass the defective or failed cells during the stack operation. Additionally, when connected in series, all the cells operate at the same current load but different voltages, depending on the internal resistance of each cell. SOFCs with high internal resistances operate at lower voltages. It is well known that SOFC degradation is strongly affected by the operating voltage. Low operating voltage results in a distinct increase of degradation rate. As a result, low performing cells experience higher degradation rates and fail faster than high performing cells.

Additionally, achieving and maintaining a gas tight seal at high temperatures is extremely difficult. Most stack failures can be directly related to sealing issues. Glass is conventionally used as the sealing material. However, glass is rigid, brittle and can easily fail during thermal cycling. In addition, the additives of glass (Al, Si, B, etc. . . . ) can readily migrate and react with cell materials in SOFCs, producing undesired phases and increasing resistance. Compressive seals (i.e. mica-based gaskets) exhibit higher leak rates than glass seals and typically require high pressure.

There exists a need to design a novel SOFC stack design that eliminates or reduces the issues concerning conventional SOFC stack designs.

BRIEF SUMMARY OF THE DISCLOSURE

A device comprising a first solid oxide fuel cell and a second solid oxide fuel cell. The first solid oxide fuel cell comprises a first anode, a first cathode and a first electrolyte, wherein the first electrolyte is positioned between and connected to the first anode and the first cathode. The second solid oxide fuel cell comprises a second anode, a second cathode and a second electrolyte, wherein the second electrolyte is positioned between and connected to the second anode and the second cathode. In this device the cathode distance between the first cathode and the second cathode is less than the anode distance between the first anode and the second anode.

In another embodiment, a device comprising a first solid oxide fuel cell comprising a first anode, a first cathode and a first electrolyte, wherein the first electrolyte is positioned between and connected to the first anode and the first cathode. The device also comprising a second solid oxide fuel cell comprising a second anode, a second cathode and a second electrolyte, wherein the second electrolyte is positioned between and connected to the second anode and the second cathode and wherein the size of the first solid oxide fuel cell and the second solid oxide fuel cell are substantially identical. The device also comprising metallic mesh, wherein the metallic mesh comprises silver and is disposed between the first cathode and the second cathode. The device also comprising a plurality of anode seals. The device also comprising a cover, wherein the cover is capable of encasing the first solid oxide fuel, the second solid oxide fuel cell, the metallic mesh and the plurality of anode seals and wherein the cover is stainless steel. In this device the cathode distance between the first cathode and the second cathode ranges from about 50 μm to about 500 μm and the anode distance between the first anode and the second anode ranges from about 100 μm to about 2,000 μm, and wherein the plurality of anode seals couple the first anode and the second anode to the interior walls of the cover.

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

The following examples of certain embodiments of the invention are given. Each example is provided by way of explanation of the invention, one of many embodiments of the invention, and the following examples should not be read to limit, or define, the scope of the invention.

Figure 1:
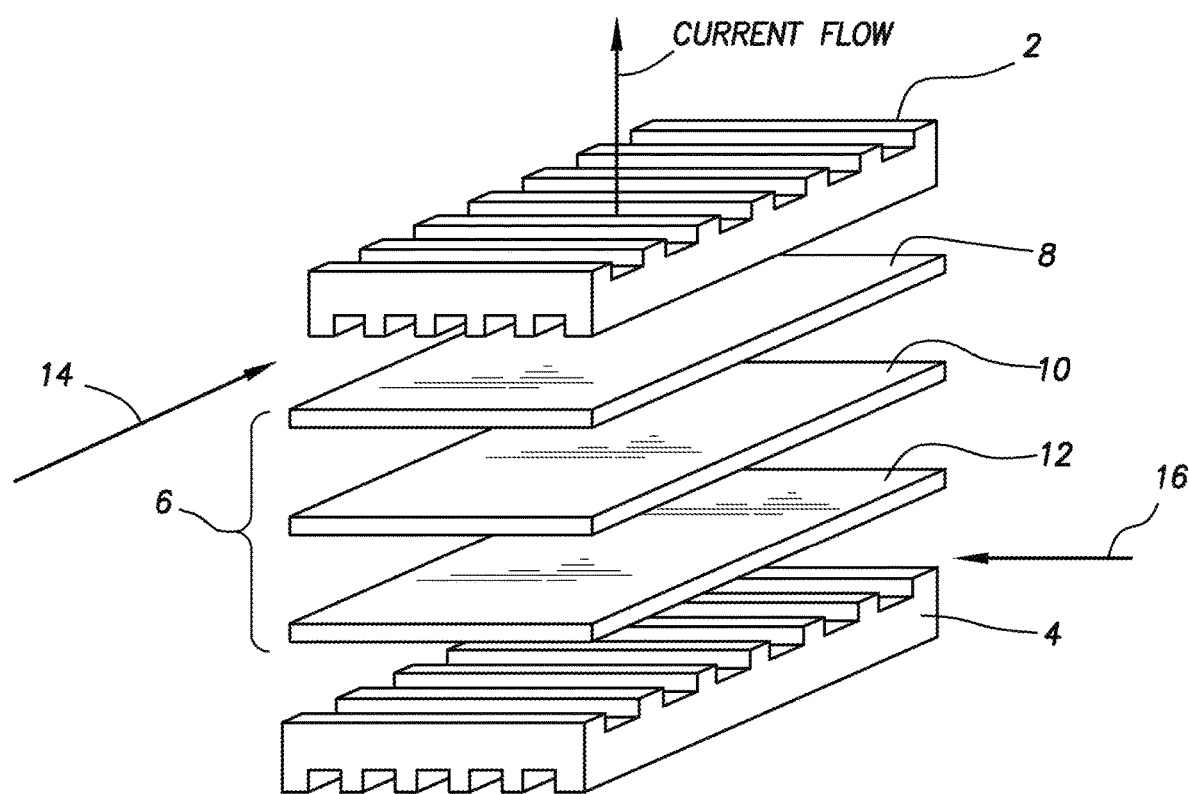
FIG. 1 depicts a conventional planar SOFC stack.

FIG. 1 depicts the repeat unit of a conventional planar SOFC stack. As depicted in FIG. 1, the repeat unit of a conventional planar SOFC stack has a top interconnect (2) and a bottom interconnect (4). In between the top interconnect and the bottom interconnect comprises multiple fuel cell components (6). Only one fuel cell is depicted in FIG. 1. The fuel cell comprises an anode (8), an electrolyte (10), and cathode (12) from top to bottom. As shown in FIG. 1, the direction of fuel flow (14) is shown to be perpendicular to the air flow (16). The unlabeled channels parallel to the air flow in the top interconnect and the bottom interconnect are used to channel air through the SOFC stack. The unlabeled channels parallel to fuel flow in the top interconnect and the bottom interconnect are used to channel fuel through the SOFC stack.

Figure 2:
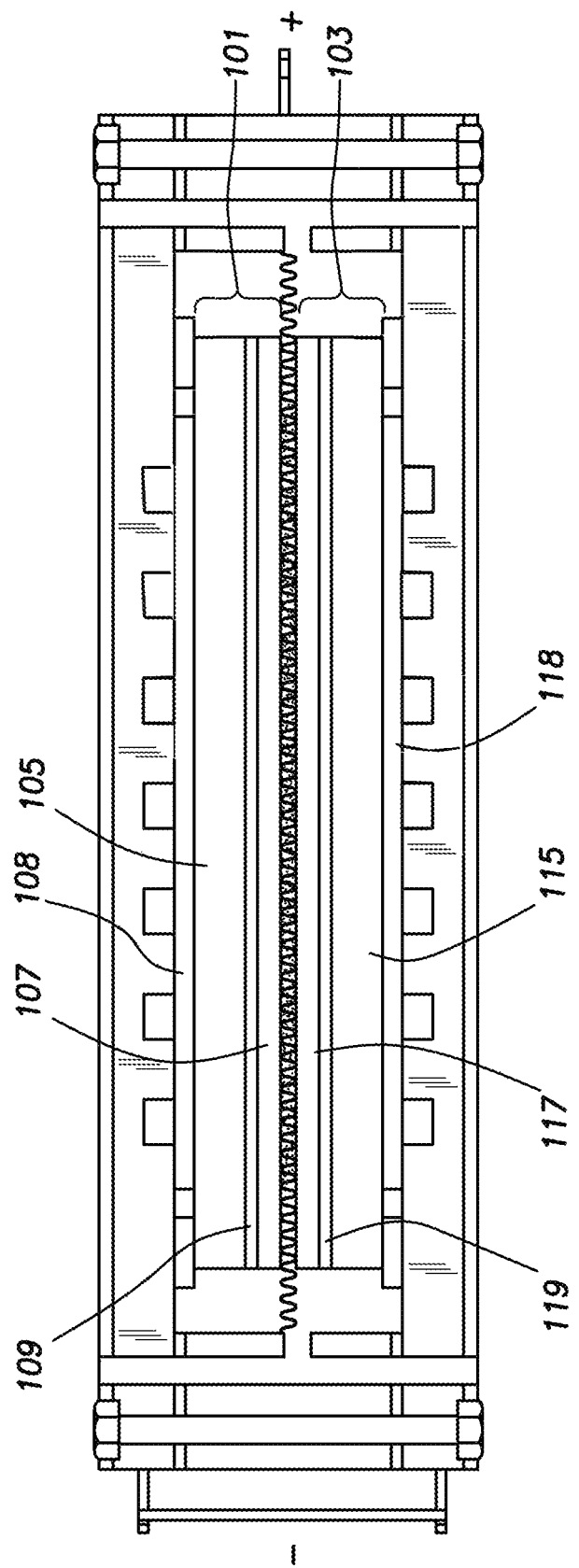
FIG. 2 depicts a current embodiment of the device.

As depicted in FIG. 2, the current embodiment describes a device comprising a first solid oxide fuel cell (101) and a second solid oxide fuel cell (103). The first solid oxide fuel cell comprises a first anode (105), a first cathode (107), and a first electrolyte (109), wherein the first electrolyte is positioned between and connected to the first anode and the first cathode. A first anode contact paste (108) can also be placed on top of the first anode. The second solid oxide fuel cell comprises a second anode (115), a second cathode (117), and a second electrolyte (119), wherein the second electrolyte is positioned between and connected to the second anode and the second cathode. A second anode contact paste (118) can also be placed on top of the first anode. The first anode contact paste and the second anode contact paste can be used to enhance electrical contact between anodes and interconnects.

As shown in the figure it is envisioned that the solid oxide fuel cells are planar solid oxide fuel cells. In this device the cathode distance between the first cathode and the second cathode is less than the anode distance between the first anode and the second anode. It is envisioned that the cathode distance between the first cathode and the second cathode can range from about 50 µm to about 500 µm. In other embodiments, the cathode distance between the first cathode and the second cathode can range from about 25 µm to about 500 µm, from about 50 µm to about 150 µm, from about 50 µm to about 100 µm, from about 50 µm to about 75 µm, from about 75 µm to about 200 µm, from about 100 µm to about 200 µm, or even from about 150 µm to about 200 µm.

It is envisioned that the anode distance between the first anode and the second anode can range from about 100 µm to about 2,000 µm. In other embodiments, the anode distance between the first anode and the second anode can range from about 100 µm to about 1,500 µm, from about 100 µm to about 1,000 µm, from about 100 µm to about 500 µm, from about 150 µm to about 2,000 µm, from about 500 µm to about 2,000 µm, from about 1,000 µm to about 2,000 µm, or even from about 1,500 µm to about 2,000 µm.

In one embodiment, the first anode and the second anode can comprise of identical materials or different materials. In another embodiment, the first cathode and the second cathode can comprise of identical materials or different materials. In yet another embodiment, the first electrolyte and the second electrolyte can comprise of identical materials or different materials. In one embodiment it is envisioned that the first solid oxide fuel cell and the second solid oxide fuel cell are substantially identical. Substantially identical can mean that the materials are the same and/or that the size of the solid oxide fuel cells are the same. For example, when the materials are the same, the materials for the first anode, first cathode and the first electrolyte are identical to the materials for the second anode, second cathode and the second electrolyte. When the sizes are the same, the sizes of the first anode, first cathode and the first electrolyte are the same as the sizes for the second anode, second cathode and the second electrolyte.

In one embodiment, the thickness of the electrolyte can be from about 5 µm to about 250 µm. In other embodiments, the electrolyte thickness can be from about 1 µm to about 500 µm or from about 5 µm to about 200 µm.

In yet another embodiment, the thickness of the anode can be from about 20 µm to about 500 µm. In other embodiments, the anode thickness can be from about 10 µm to about 1,000 µm or from about 20 µm to about 400 µm.

In another embodiment, the thickness of the cathode can be from about 20 µm to about 100 µm. In other embodiments, the cathode thickness can be from about 10 µm to about 200 µm or from about 20 µm to about 75 µm.

It is envisioned that the electrolyte materials for the device can be any conventionally known electrolyte materials. One example of electrolyte materials can include doped zirconia electrolyte materials, doped ceria materials or doped lanthanum gallate materials. Examples of dopants for the doped zirconia electrolyte materials can include: CaO, MgO, $Y_2O_3$, $Sc_2O_3$, $Sm_2O_3$ and $Yb_2O_3$. In one embodiment the electrolyte material is a yttria-stabilized zirconia, $(ZrO_2)_{0.92}(Y_2O_3)_{0.08}$.

In one embodiment, anode materials for the device can be any conventionally known anode materials. Examples of the anode materials can include mixtures of NiO, yttria-stabilized zirconia, gadolinium-doped ceria, CuO, CoO and FeO. In one embodiment the anode material is a mixture of 50 wt. % NiO and 50 wt. % yttria-stabilized zirconia.

In one embodiment, cathode materials for the device can be any conventionally known cathode materials. One example of cathode materials can be perovskite-type oxides with the general formula $ABO_3$, wherein A cations can be La, Sr, Ca, Pb, etc. and B cations can be Ti, Cr, Ni, Fe, Co, Zr, etc. . . . Other examples of cathode materials can be mixtures of lanthanum strontium cobalt ferrite, lanthanum strontium manganite, lanthanum strontium manganite, or even yttria-stabilized zirconia and gadolinium-doped ceria. Examples of the cathode materials include: $Pr_{0.5}Sr_{0.5}FeO_{3-\delta}$; $Sr_{0.9}Ce_{0.1}Fe_{0.8}Ni_{0.2}O_{3-\delta}$; $Sr_{0.8}Ce_{0.1}Fe_{0.7}Co_{0.3}O_{3-\delta}$; $LaNi_{0.6}Fe_{0.4}O_{3-\delta}$; $Pr_{0.8}Sr_{0.2}Co_{0.2}Fe_{0.8}O_{3-\delta}$; $Pr_{0.7}Sr_{0.3}Co_{0.2}Mn_{0.8}O_{3-\delta}$; $Pr_{0.8}Sr_{0.2}FeO_{3-\delta}$; $Pr_{0.6}Sr_{0.4}Co_{0.8}Fe_{0.2}O_{3-\delta}$; $Pr_{0.4}Sr_{0.6}Co_{0.8}Fe_{0.2}O_{3-\delta}$; $Pr_{0.7}Sr_{0.3}Co_{0.9}Cu_{0.1}O_{3-\delta}$; $Ba_{0.5}Sr_{0.5}Co_{0.8}Fe_{0.2}O_{3-\delta}$; $Sm_{0.5}Sr_{0.5}CoO_{3-\delta}$; and $LaNi_{0.6}Fe_{0.4}O_{3-\delta}$. In one embodiment the cathode material is a mixture of gadolinium-doped ceria $(Ce_{0.9}Gd_{0.1}O_2)$ and lanthanum strontium cobalt ferrite $(La_{0.6}Sr_{0.4}Co_{0.2}Fe_{0.8}O_3)$ or a mixture of gadolinium-doped ceria $(Ce_{0.9}Gd_{0.1}O_2)$ and samarium strontium cobaltite, $Sm_{0.5}Sr_{0.5}CoO_3$.

Optionally, a metallic mesh can be disposed between the first cathode and the second cathode and can be used for air distribution and current collection between the first solid oxide fuel cell and the second solid oxide fuel cell. It is envisioned that the metallic mesh can be used with or without conventional cathode contact paste. The metallic mesh used can be any conventionally known metal or metal alloy mesh such as steel, stainless steel, palladium, nickel, nickel-based alloys, cobalt-based alloys, lanthanum chromite-based alloys, gold, silver or silver alloys. The exact characteristics of the mesh can be any conventionally known metal mesh material capable for air distribution including: perforated plates, porous metals, corrugated sheets, woven wires or expanded meshes. In one embodiment, pore formers are used together with the metal mesh to better form channels for increased air distribution. In another embodiment, conventional cathode contact pastes can be used together with metallic mesh to improve performance. In yet another embodiment, the two SOFCs can share a single cathode wherein the metallic mesh is imbedded.

Figure 3:
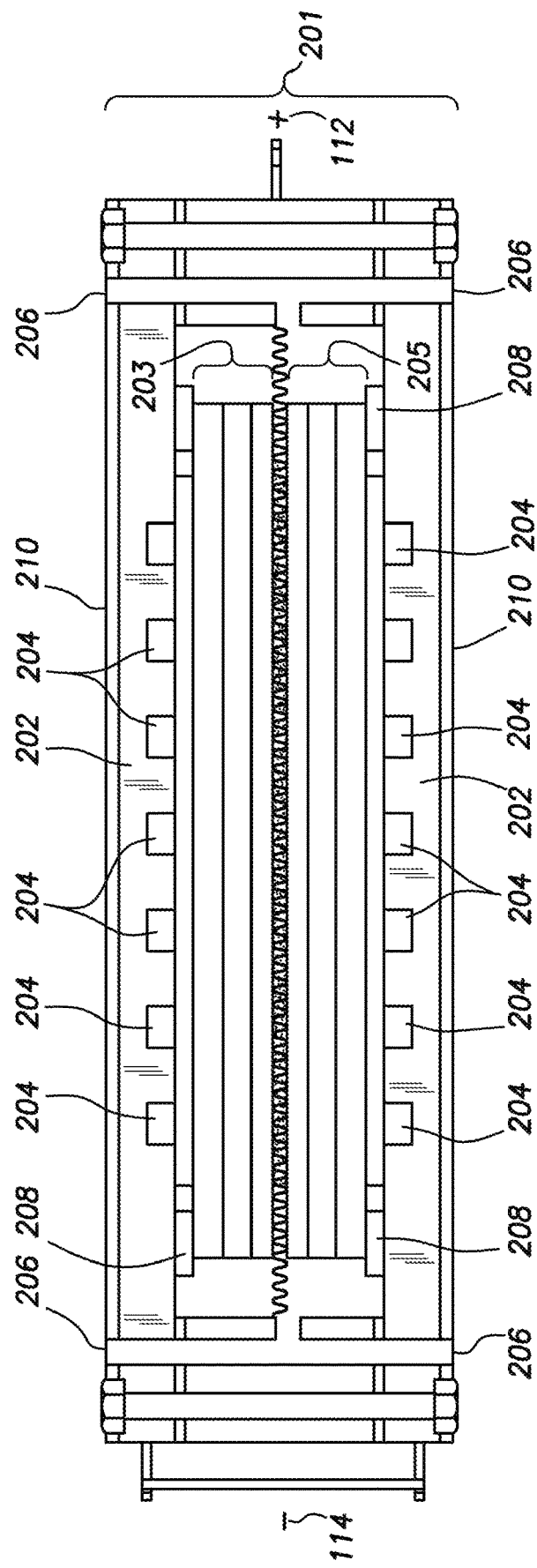
FIG. 3 depicts a solid oxide fuel cell cassette.

It is envisioned that this device can be utilized as a solid oxide fuel cell cassette. When used as a cassette it is envisioned that the first solid oxide fuel cell and the second solid oxide fuel cell are encased in a cover. This solid oxide fuel cell cassette (201) with its cover (202) is depicted in FIG. 3. This embodiment of the solid oxide fuel cell cassette has the cover encasing the first solid oxide fuel cell (203) and the second solid oxide fuel cell (205). The cover can have multiple openings such as fuel openings (204) and air openings (206). Spacers or seals (208) can be used to ensure that the fuel is separated from the air and also the negative electrode is separated from the positive electrode. Optionally, and as depicted in FIG. 3, the cover can be covered with an electrical insulator (210). Any conventionally known electrical insulator can be used as long as it will hinder the flow of electrical current outside the solid oxide fuel cell cassette (201). As a way to obtain electricity from the solid oxide fuel cell cassette, at least one positive electrode (112) and at least one negative electrode (114) can be placed on the outer edges of the solid oxide fuel cell cassette.

Figure 4:
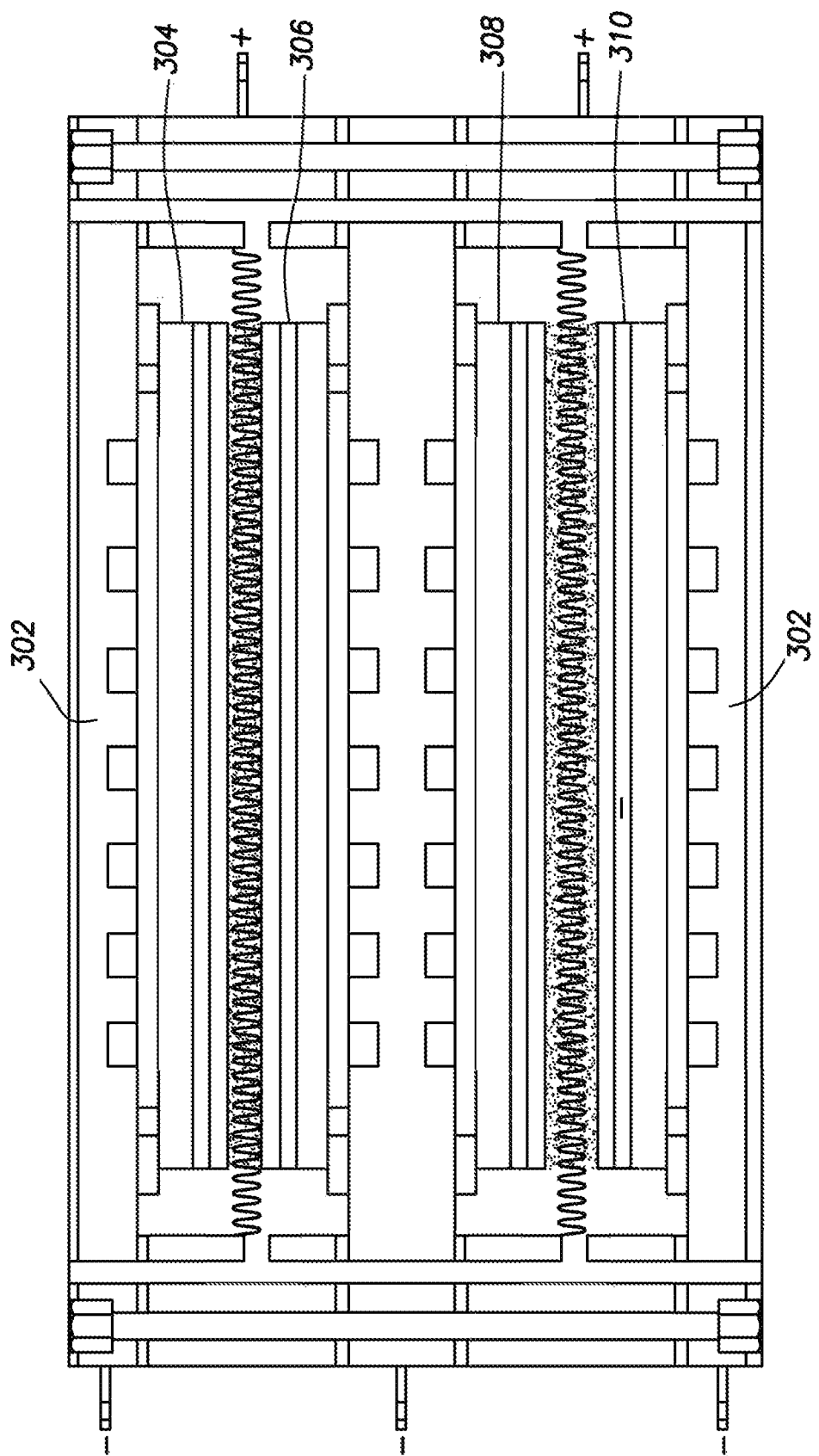
FIG. 4 depicts an embodiment of a solid oxide fuel cell cassette.

In alternate embodiments it is envisioned that the solid oxide fuel cell cassette can contain more than one device, or one pair of solid oxide fuel cells. Solid oxide fuel cell cassettes can contain any even number of solid oxide fuel cells, such as four, six, eight, ten or even 12. One particular embodiment with four solid oxide fuel cells is shown in FIG. 4. This embodiment is similar to FIG. 3, in that a cover (302) is shown encasing the first solid oxide fuel cell (304), the second solid oxide fuel cell (306), the third solid oxide fuel cell (308) and the fourth solid oxide fuel cell (310). In this embodiment, optional metallic meshes can be placed between the cathode sides of the first solid oxide fuel cell and the second solid oxide fuel cell, and between the cathode sides of the third solid oxide fuel cell and the forth solid oxide fuel cell.

Figure 5:
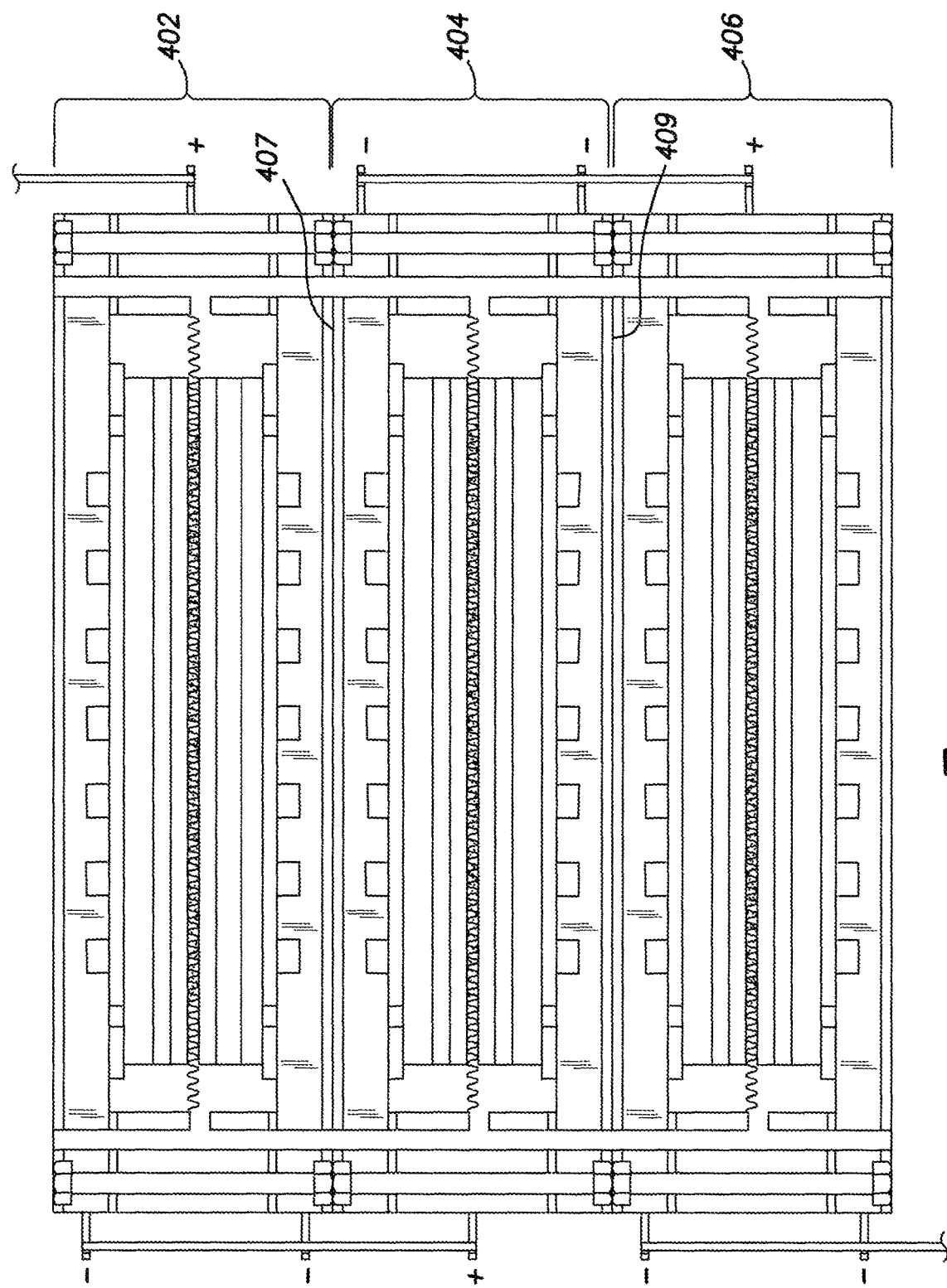
FIG. 5 depicts an embodiment of multiple solid oxide fuel cell cassettes.

In yet another embodiment, multiple solid oxide fuel cell cassettes can be connected together to achieve greater electrical output with the solid oxide fuel cell cassettes being wired in series. This embodiment is shown in FIG. 5 where the first solid oxide fuel cell cassette (402), the second solid oxide fuel cell cassette (404) and the third solid oxide fuel cell cassette (406) are stacked together and wired to generate increased electrical output. In this embodiment electrical insulators (407 and 409) can be placed in between the solid oxide fuel cell cassettes. It is envisioned that when multiple solid oxide fuel cell cassettes are connected together an infinite number of solid oxide fuel cell cassettes can be wired in series together to generate the needed electrical output.

Figure 6:
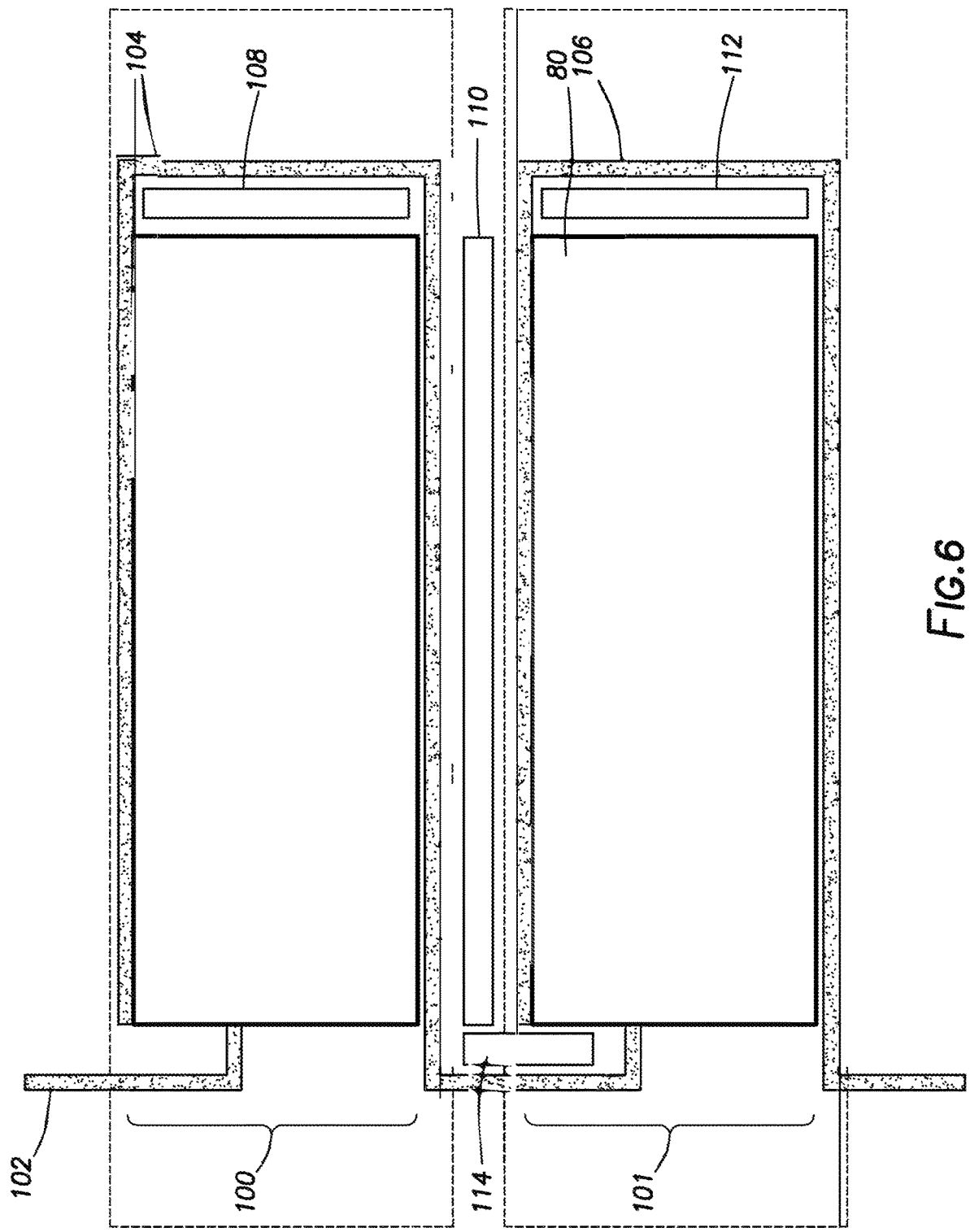
FIG. 6 depicts an embodiment of multiple solid oxide fuel cell cassettes.

Optionally, a banded mesh can be used to connect adjacent devices. As shown on FIG. 6, banded mesh 102, 104 and 106 are used to connect devices 100 and 101. Each device 100 and 101 contains a first solid oxide fuel cell and a second solid oxide fuel cell. The banded mesh can be made from any conventionally known mesh material such as silver, silver alloys, stainless steels, nickel-based alloys and other high temperature alloys. Optional electrical spacers can be disposed as 108, 110, 112, and 114. These optional electrical spacers can be any high temperature non-conductive materials such as alumina, zirconia, mica and glass.

Example 1

In this example two different solid oxide fuel cell short stacks were created. Each SOFC stack comprised two fuel cells. The first solid oxide fuel cell stack was created similar to FIG. 2. This first solid oxide fuel cell stack has a first anode and a second anode comprising 50 wt. % Ni-50 wt. % $(ZrO_2)_{0.92}(Y_2O_3)_{0.08}$, a first cathode and a second cathode comprising 50 wt. % $La_{0.6}Sr_{0.4}Co_{0.2}Fe_{0.8}O_3$-50 wt. % $Ce_{0.9}Gd_{0.1}O_2$ a first electrolyte and a second electrolyte comprising $(ZrO_2)_{0.92}(Y_2O_3)_{0.08}$, and a first cathode barrier layer and a second cathode barrier layer comprising $Ce_{0.9}Gd_{0.1}O_2$. The second solid oxide fuel cell stack was created similar to FIG. 1. Each fuel cell of the second solid oxide fuel cell stack has an anode comprising 50 wt. % Ni-50 wt. % $(ZrO_2)_{0.92}(Y_2O_3)_{0.08}$, a cathode comprising 50 wt. % $La_{0.6}Sr_{0.4}Co_{0.2}Fe_{0.8}O_3$-50 wt. % $Ce_{0.9}Gd_{0.1}O_2$, a cathode barrier layer comprising $Ce_{0.9}Gd_{0.1}O_2$, and an electrolyte comprising $(ZrO_2)_{0.92}(Y_2O_3)_{0.08}$.

Figure 7:
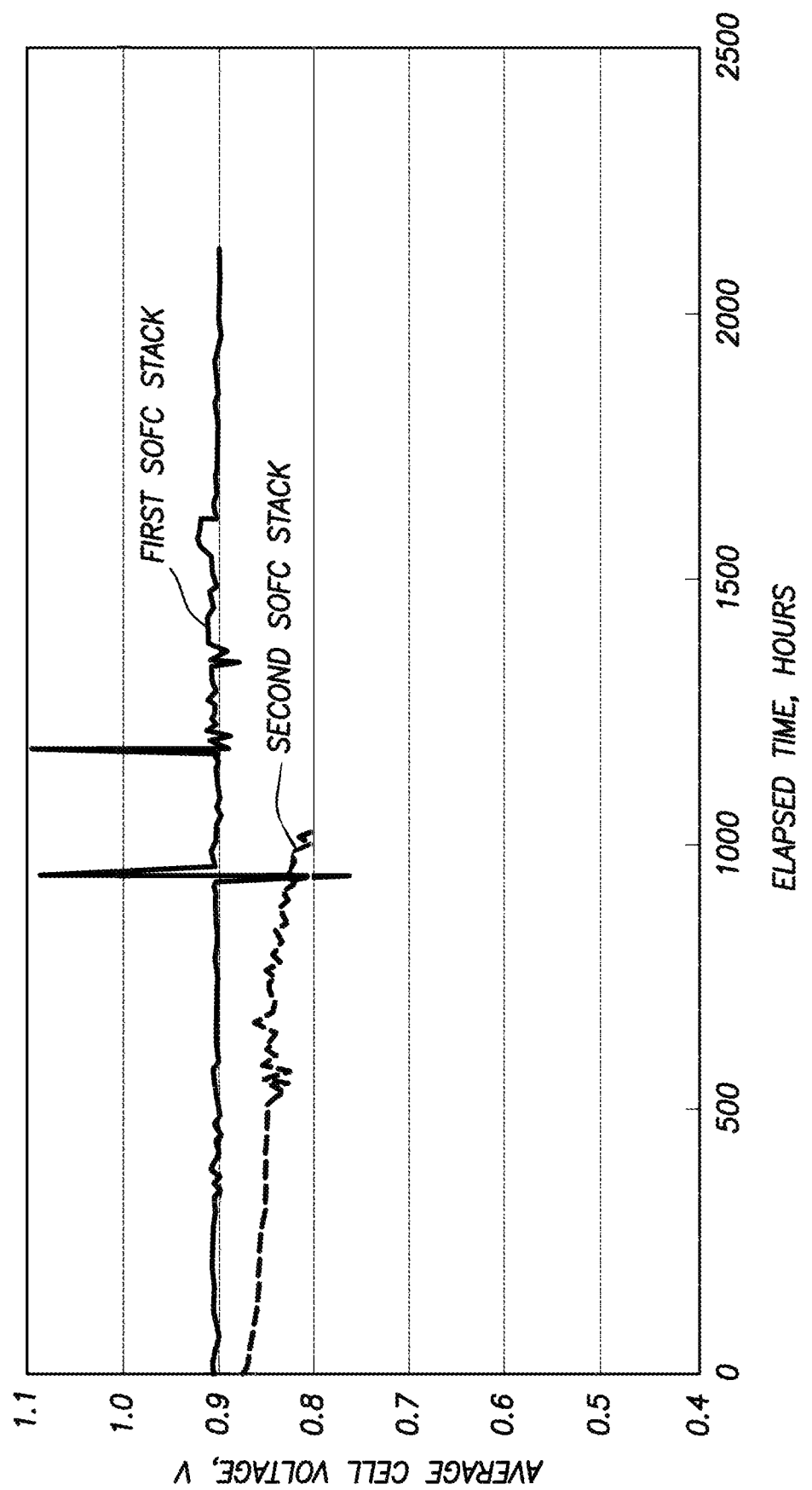
FIG. 7 depicts a comparative example of a conventional planar SOFC stack versus the current embodiment of the device.

Both the first solid oxide fuel cell stack and the second solid oxide fuel cell stack were operated at 700° C. with hydrogen fuel with a current density of 200 mA/cm². As shown in FIG. 7 the first solid oxide fuel cell stack has a higher average cell voltage and lower performance degradation. It is theorized that with this novel solid oxide fuel cell design one would be able to sustain an average cell voltage of greater than 0.9 V or even 0.95 V for a long time.

In closing, it should be noted that the discussion of any reference is not an admission that it is prior art to the present invention, especially any reference that may have a publication date after the priority date of this application. At the same time, each and every claim below is hereby incorporated into this detailed description or specification as an additional embodiment of the present invention.

Although the systems and processes described herein have been described in detail, it should be understood that various changes, substitutions and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:
1. A device comprising:
   a first solid oxide fuel cell comprising a first anode, a first cathode and a first electrolyte, wherein the first electrolyte is positioned between and connected to the first anode and the first cathode; and
   a second solid oxide fuel cell comprising a second anode, a second cathode and a second electrolyte, wherein the second electrolyte is positioned between and connected to the second anode and the second cathode;

wherein a distance between the first cathode and the second cathode is less than a distance between the first anode and the second anode, and wherein a metallic mesh is disposed between the first cathode and the second cathode.

2. The device of claim 1, wherein the first electrolyte and the second electrolyte comprise of identical materials.

3. The device of claim 1, wherein the first anode and the second anode comprise of identical materials.

4. The device of claim 1, wherein the first cathode and the second cathode comprise of identical materials.

5. The device of claim 1, wherein the first electrolyte and the second electrolyte comprise of different materials.

6. The device of claim 1, wherein the first anode and the second anode comprise of different materials.

7. The device of claim 1, wherein the first cathode and the second cathode comprise of different materials.

8. The device of claim 1, wherein the first electrolyte and the second electrolyte comprise a yttria-stabilized zirconia.

9. The device of claim 1, wherein the first cathode and the second cathode are selected from the group consisting of samarium strontium cobaltite, lanthanum strontium cobalt ferrite, lanthanum strontium manganite, gadolinium-doped ceria, yttria-stabilized zirconia and combinations thereof.

10. The device of claim 1, wherein the first anode and the second anode comprise a mixture of a nickel oxide and a yttria-stabilized zirconia or gadolinium doped ceria.

11. The device of claim 1, wherein the size of the first solid oxide fuel cell and the second solid oxide fuel cell are substantially identical.

12. The device of claim 1, wherein the first solid oxide fuel cell and the second solid oxide fuel cell are planar solid oxide fuel cells.

13. The device of claim 1, wherein a cover of stainless steel encases the first solid oxide fuel and the second solid oxide fuel cell.

14. The device of claim 1, wherein the cathode distance between the first cathode and the second cathode ranges from about 50 μm to about 200 μm.

15. The device of claim 1, wherein the anode distance between the first anode and the second anode ranges from about 100 μm to about 2,000 μm.

16. A device comprising:
a first solid oxide fuel cell comprising a first anode, a first cathode and a first electrolyte, wherein the first electrolyte is positioned between and connected to the first anode and the first cathode; and
a second solid oxide fuel cell comprising a second anode, a second cathode and a second electrolyte, wherein the second electrolyte is positioned between and connected to the second anode and the second cathode;
wherein a distance between the first cathode and the second cathode is less than a distance between the first anode and the second anode, and
wherein a banded mesh is used to connect one device to a second device.

17. The device of claim 16, wherein the banded mesh comprises of silver, silver alloys, stainless steels, nickel-based alloys and other high temperature alloys.

* * * * *